3,177,766
MIRROR FOR REAR VIEW PROJECTOR
Leonard S. Ray, 606 Chaplin St. SW., Washington, D.C.
Filed July 27, 1962, Ser. No. 213,070
3 Claims. (Cl. 88—24)
(Granted under Title 35, U.S. Code (1952), sec. 266)

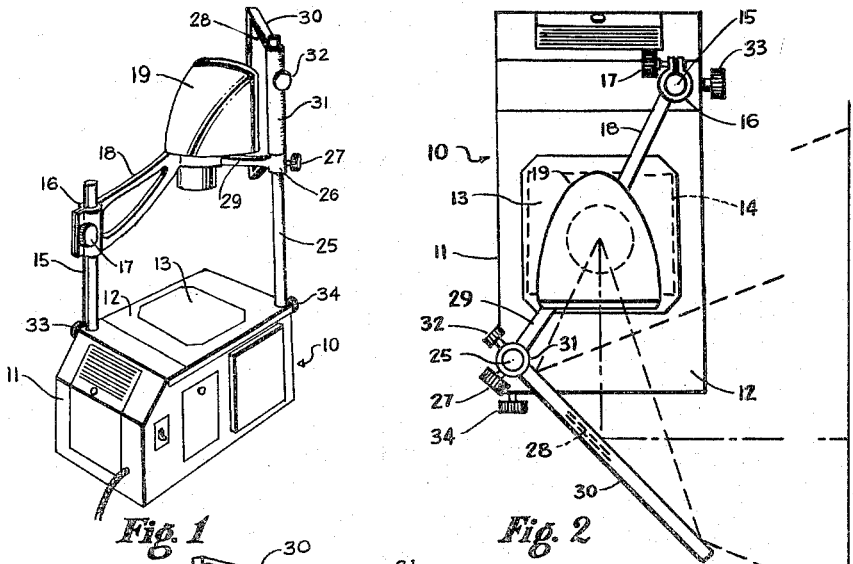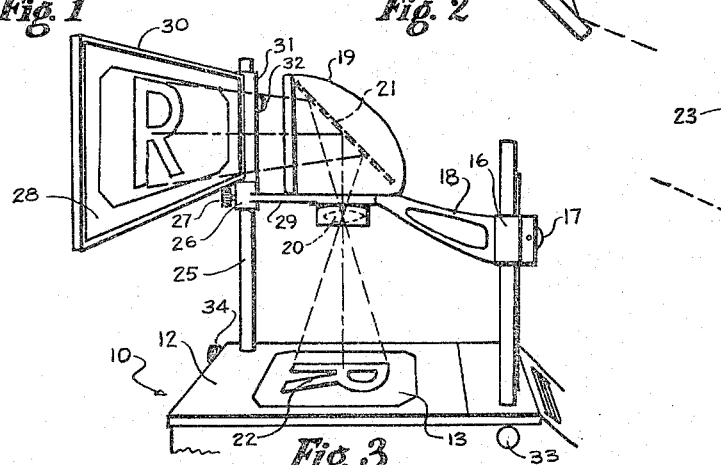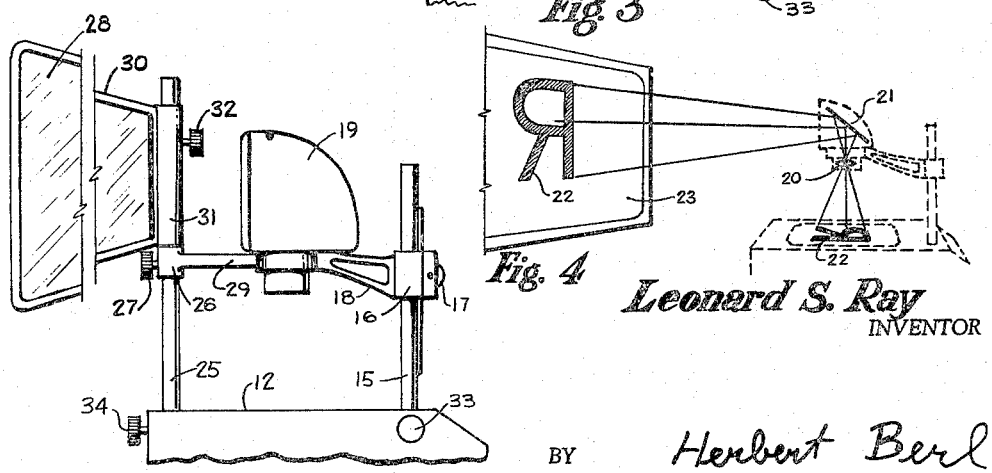

The invention described herein, if patented, may be manufactured and used by or for the Government for governmental purposes, without the payment to me of any royalty thereon.

The invention relates to projectors for slides and more particularly to the so called rear view projectors wherein the operator and the projector are located behind the screen so that the picture is projected upon the rear of a translucent screen for viewing by an audience in front of the screen.

Such projectors must be located in at least semi-darkness and in the type of projector with which the invention is particularly concerned, the slide is mounted on top of a housing containing a source of light and is projected thereby through a lens system upwardly of the slide, which lens system projects the picture at a 90° angle onto the rear of the screen. With such a projector the picture is reversed for the operator on both the slide mount and on the rear of the screen. This makes it extremely difficult for the operator in instances where he is required to read the subject matter as when he is both operator and lecturer.

With the foregoing in view, it is an object of the invention to provide an accessory for a rear view projector which enables the operator to have proper view of the slide while the same is on the slide mount.

A further object is to provide such an accessory which comprises a mirror or prism which is interposed between the lens system of the projector and the screen whereby to reverse the normal image one additional time.

A further object is to provide novel mounting means for the mirror or prism so that the same can be adjusted to correspond to any necessary adjustments of the lens system and also to provide for adjustment of the image reversing means independently of the lens system.

Other objects and advantages reside in the particular structure of the invention, the structure of the several elements of the same, combinations and subcombinations of such elements with each other and/or with a projector and screen, all of which will be readily apparent to those skilled in the art upon reference to the attached drawing which discloses one species of the invention and to the following specification wherein the invention is described and claimed.

In the drawing:
FIGURE 1 is a perspective view of a rear view projector to which one form of the invention has been applied.
FIGURE 2 is a top plan view of the same;
FIGURE 3 is a side elevational view thereof;
FIGURE 4 is a diagrammatic view showing the prior art arrangement; and
FIGURE 5 is a fragmentary elevational view showing certain details of structure.

Referring specifically to the drawing, wherein like reference characters designate like parts in all views, 10 designates generally a rear view projector which comprises a housing 11 in which is located any suitable source of light, not shown. Housing 11 includes a top wall 12 which is provided with any suitable means for mounting a slide or transparency 13 over an opening 14 in such top through which light rays from the light source are projected. An upright 15 extends above the top wall 13. A collar 16 is adjustable mounted on said upright by means of a thumbscrew 17. Collar 16 has a bracket arm 18 fixed thereto in any suitable manner so as to extend laterally thereof. A lens system 19 is fixed to the free end of arm 18 and includes an image inverting lens 20 as well as an image reverting means 21 whereby the image 22 of the slide 13 is projected from the lens system at an angle of 90° to the housing top and in inverted and reverted form in a well known manner. The lens system is focused on a screen 23 by adjusting the same vertically on upright 15.

As best seen in FIGURE 4, in the normal projector of this type, the image 22 of the slide appears in reverted form to the operator both on the slide mount and on the screen 23. Thus, he experiences great difficulty in reading any printed message which may be included on the slide 13. This difficulty has been overcome in the invention by means now to be described.

A second upright 25 is mounted on the housing 11 in any suitable manner and adjustably mounts a collar 26 thereon by means of a thumbscrew 27. An image reverting device of any suitable form such as the mirror 28 extends laterally of the upright 25. Mirror 28 includes a frame 30 one edge of which is formed as a sleeve 31 which is slidable and pivotally mounted on the upright 25 in superposed relation to collar 26. The mirror and sleeve 31 may be held against relative movement on upright 25 by any suitable means such as the thumbscrew 32. Thus, the mirror 28 may be adjustable vertically so as to be aligned with the lens system 19 and may also be adjusted angularly relative thereto. These adjustments adapt the mirror to be positioned in the path of the projected image and will revert the same and project such reverted image onto the rear of the screen 23. Of course, the image thus projected appears properly to the audience in front of the screen 23.

To achieve this effect, it is only necessary to turn over the slide 13 when placing it on the slide mount. That is to say, instead of placing the slide on the slide mount upside down, it is placed thereon right side up. This enables the operator to read the slide while in position on the mount or in the mirror if this is more convenient.

It is obvious that the invention may be entirely independent of the lens system 19 if desired. However, in the embodiment illustrated it is connected thereto by an arm 29 which amounts to a rigid extension of bracket arm 18 and which is fixed to the collar 26 and to the lens system 19 in any suitable manner. Thus, by loosening thumbscrews 17, 27 and 32 both lens system 19 and mirror 28 may be raised or lowered as a unit while maintaining their alignment. This arrangement has the advantage of providing a steadier mount for the lens system 19 and relieves the arm 18 of some of the weight. In the event that the uprights 15 and 25 are cylindrical, they may be locked against rotation in their sockets any suitable means such as the thumbscrews 33 and 34 respectively.

It should be noted that the mirror may be in the form of a reclining truncated equilateral triangle because that is the shape assumed by a rectangular slide striking the mirror at a 45° angle. Of course, if the mirror is large enough, it may comprise a simple rectangle.

It is obvious that the invention may be readily applied to standard rear view projectors with a minimum of modification of the latter. Likewise, the device may be immobilized when not needed, as when the projector is used as a front view projector or is projecting nothing but pictorial material, simply by loosening the thumbscrew 32 and swinging the mirror 28 around the upright 25 until it is out of the path of the projected image.

While there has been shown and described what is now thought to be the preferred embodiment of the invention, it is to be understood that the same is susceptible of other forms of expressions. Consequently, I do not limit myself to the precise structure shown and described hereinabove except as hereinafter claimed.

I claim:
1. The combination with a rear view slide projector having a base including a top wall, a source of light in said base, a substantially horizontal slide mount on said top wall, a lens system for receiving a vertically projected image and projecting it horizontally in one direction, means mounting said lens system in upwardly spaced alignment with said slide mount for vertical adjustment toward and away from the same; of a vertically disposed mirror, means mounting said mirror above said base in laterally spaced relation to said lens system and for vertical adjusting movement corresponding to like movement of said lens system, said mounting means for said mirror including means for pivoting the same on a vertical axis into and out of alignment with an image projected horizontally in one direction by said lens system, whereby to at times project such image horizontally in a second direction.

2. The combination of claim 1, therebeing supporting means supporting said mounting means for said mirror, means rigidly connecting said supporting means to said mounting means for said lens system for simultaneous vertical adjustment therewith.

3. The combination with a rear view slide projector having a base including a top wall, a source of light in said base, a substantially horizontal slide mount on said top wall, a lens system for receiving a vertically projected image and projecting it horizontally in one direction, an upright carried by said base and extending above the same at one side thereof, a bracket arm carried by said upright for vertical movement thereon, means mounting said lens system on said bracket arm in vertical alignment with said slide mount for vertical adjustment toward and away from the same; of a second upright carried by said base and projecting above the same in oppositely disposed relation to said first named upright, said bracket arm having a rigid extension, means mounting said extension on said second upright for vertical adjusting movement therealong, a mirror, means mounting said mirror on said second upright in superposed relation to said means mounting said extension thereon, said means mounting said mirror on said second upright permitting pivotal and vertical adjusting movement of the same on said second upright independently of said vertical adjustment of said lens system, and said mirror being pivotally adjustable into and out of alignment with an image projected horizontally by said lens system whereby at times to project such image horizontally in a second direction.

References Cited by the Examiner

UNITED STATES PATENTS

| | | | |
|---|---|---|---|
| 2,562,297 | 7/51 | Cordonnier | 88—24 |
| 2,564,057 | 8/51 | Fitzgerald | 88—24 |
| 2,568,734 | 9/51 | Heyer | 88—24 |

OTHER REFERENCES

"Face Your Audience, Operate Your Own Balopticon," by Bausch and Lomb Optical Co., Rochester, N.Y., No. 3-144; 6-30, June 1930, a five page fold-out leaflet.

NORTON ANSHER, *Primary Examiner.*

WILLIAM MISIEK, *Examiner.*